United States Patent
Hjelmvik

(10) Patent No.: US 7,114,651 B2
(45) Date of Patent: *Oct. 3, 2006

(54) METHOD FOR CONTROL OF PARKED VEHICLES

(75) Inventor: Torbernt Hjelmvik, Järfälla (SE)

(73) Assignee: Modul-System Sweden AB, Järfälla (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/500,771

(22) PCT Filed: Jan. 15, 2003

(86) PCT No.: PCT/SE03/00052

§ 371 (c)(1),
(2), (4) Date: Jul. 6, 2004

(87) PCT Pub. No.: WO03/065312

PCT Pub. Date: Aug. 7, 2003

(65) Prior Publication Data

US 2005/0086099 A1 Apr. 21, 2005

(30) Foreign Application Priority Data

Jan. 28, 2002 (SE) .................... 0200234

(51) Int. Cl.
*G07B 15/02* (2006.01)
*G07B 15/00* (2006.01)
*G06F 19/00* (2006.01)
*G06Q 30/00* (2006.01)
*G06Q 90/00* (2006.01)

(52) U.S. Cl. .............. 235/384; 235/385; 705/13; 705/418

(58) Field of Classification Search ............... 705/26, 705/16, 13, 417–418, 17; 340/932.2; 702/57, 702/79, 177–178, 187–188; 700/104; 701/32; 379/90.01, 106.01; 235/381, 384, 382, 385; 704/200

See application file for complete search history.

(56) References Cited

U.S. PATENT DOCUMENTS

| 5,109,399 | A | * | 4/1992 | Thompson | 379/201.08 |
| 5,263,118 | A | * | 11/1993 | Cornelison | 704/200 |
| 5,432,508 | A | * | 7/1995 | Jackson | 340/932.2 |
| 5,710,557 | A | * | 1/1998 | Schuette | 340/932.2 |
| 5,905,247 | A | * | 5/1999 | Ilen | 235/384 |

(Continued)

FOREIGN PATENT DOCUMENTS

JP 08226241 A * 9/1996

(Continued)

*Primary Examiner*—Daniel Walsh
(74) *Attorney, Agent, or Firm*—Alfred J. Mangels

(57) ABSTRACT

A method of controlling vehicles parked in a parking system. A user sends a user-specific code to a parking system computer via a mobile telephone system when beginning and terminating a parking period. The identity of the parking zone concerned is sent to the computer, in which a vehicle-specific code is stored and is tied to the user-specific code. A parking attendant uses a control unit for wirelessly fetching information concerning vehicles that have commenced but not terminated a parking period in the zone concerned. The control unit sends to a telephone coupled to the computer a voice message from the parking attendant that includes a vehicle registration number. The computer compares that registration number with the registration numbers of logged-in vehicles and sends to the control unit a voice message repeating the registration number and including information as to whether the vehicle is logged-in.

8 Claims, 1 Drawing Sheet

U.S. PATENT DOCUMENTS

| | | | | |
|---|---|---|---|---|
| 5,940,481 A * | 8/1999 | Zeitman | | 705/13 |
| 6,037,880 A * | 3/2000 | Manion | | 340/932.2 |
| 6,115,458 A * | 9/2000 | Taskett | | 379/114.2 |
| 6,188,328 B1 * | 2/2001 | Ho | | 340/932.2 |
| 6,246,337 B1 * | 6/2001 | Rosenberg et al. | | 340/932.2 |
| 6,249,233 B1 * | 6/2001 | Rosenberg et al. | | 340/932.2 |
| 6,373,401 B1 * | 4/2002 | Ho | | 340/932.2 |
| 6,481,622 B1 * | 11/2002 | Hjelmvik | | 235/384 |
| 6,513,711 B1 * | 2/2003 | Hjelmvik | | 235/385 |
| 6,519,329 B1 * | 2/2003 | Hjelmvik | | 379/106.1 |
| 6,577,248 B1 * | 6/2003 | Hjelmvik | | 340/932.2 |
| 6,796,499 B1 * | 9/2004 | Wang | | 235/384 |
| 6,823,317 B1 * | 11/2004 | Ouimet et al. | | 705/13 |
| 6,832,206 B1 * | 12/2004 | Chelnik | | 705/13 |
| 2001/0019308 A1 * | 9/2001 | Ho | | 340/932.2 |
| 2001/0035830 A1 * | 11/2001 | Rosenberg et al. | | 340/932.2 |
| 2002/0008639 A1 * | 1/2002 | Dee | | 340/932.2 |
| 2002/0099574 A1 * | 7/2002 | Cahill et al. | | 705/5 |
| 2002/0109610 A1 * | 8/2002 | Katz | | 340/932.2 |
| 2002/0163444 A1 * | 11/2002 | Budnovitch | | 340/932.2 |
| 2003/0010821 A1 * | 1/2003 | Silberberg | | 235/382 |
| 2003/0132840 A1 * | 7/2003 | Bahar | | 340/541 |
| 2003/0141363 A1 * | 7/2003 | Hjelmvik | | 235/382 |
| 2003/0146852 A1 * | 8/2003 | O'Dell | | 340/932.2 |
| 2003/0206117 A1 * | 11/2003 | Rosenberg et al. | | 340/932.2 |
| 2004/0039632 A1 * | 2/2004 | Han et al. | | 705/13 |
| 2004/0059693 A1 * | 3/2004 | Hausen et al. | | 705/418 |
| 2004/0094619 A1 * | 5/2004 | Silberberg | | 235/382 |
| 2004/0101118 A1 * | 5/2004 | Powell | | 379/142.1 |

FOREIGN PATENT DOCUMENTS

| | | |
|---|---|---|
| WO | WO 96/11453 A1 | 4/1996 |
| WO | WO 97/37328 A1 | 10/1997 |
| WO | WO 01/16906 A1 | 3/2001 |

* cited by examiner

METHOD FOR CONTROL OF PARKED VEHICLES

BACKGROUND OF THE INVENTION

1. Field of the Invention

The present invention relates to a method of controlling parked vehicles, primarily cars. More specifically, the invention relates to a parking system in which a mobile telephone can be used to commence and terminate parking of a vehicle 2. Description of the Related Art In cities and towns there will be one or more vehicle parking companies who have parking meters, or so-called pay meters, distributed throughout the city or town in a number of different places. Streets and large parking areas are the most common places in this regard.

In recent times, it has become more and more usual to pay parking fees with different types of bank card or cash card, as a supplement to coin payment. When a cash card is used, the person parking a vehicle will draw the card through a card reader on the parking meter.

The parking meter then issues a parking ticket, which is placed inwardly of the windscreen where it can be seen. When collecting the vehicle, the person concerned must return to the pay meter and again draw the cash card through the meter card reader. The pay meter then calculates the parking fee and stores the fee together with the number of the card to be charged.

A system in which parking of a vehicle at such parking facilities can be initiated and also terminated with the aid of a mobile telephone is known to the art.

Swedish Patent Specification 9800888-1 teaches a simple system for parking vehicles by means of a mobile telephone. According to that patent, data on a cash card or credit card owned by the user and accepted as payment means by the parking system, and at least a user-specific reference, are stored in and tied to a database belonging to the parking company concerned.

A user-specific reference is the number of the telephone that is used when parking the vehicle concerned. The telephone number is detected by the computer of the parking system as the telephone is connected to a telephone number belonging to the parking system.

A vehicle-specific reference is the registration number of the vehicle This registration number is coupled with the telephone number in the computer of the parking system and possibly also with the number of the cash card.

Whether or not commencement of a vehicle parking period has been reported to the parking can be ascertained by a parking attendant reading the registration number of the vehicle.

According to said patent, the parking attendants are equipped with a portable communications unit which is in wireless connection with a computer of the parking company in which data relating to those vehicles where parking has been commenced but not yet terminated is stored. This communications unit may be constructed for example, in accordance with the control unit described in Swedish Patent Specification 9700054-1. The parking attendant enters the parking zone concerned into the control unit and the control unit fetches from the computer a so-called parked vehicle list relating to the parking zone concerned, i.e., a list of the registration numbers of those vehicles with which the commencement of a parking period has been reported. The control unit then compares the registration numbers read-off with the list of parked vehicles and indicates when a commenced parking period has not been reported.

The system described in Swedish Patent Specification 9700054-1 is encumbered with a number of drawbacks. For instance it is desirable to enable the number of entries required by the attendants through the unit keypad to be reduced. It is also desirable to simplify handling of the control unit, which necessitates both reading and entering data. Handling of the unit is particularly difficult in winter when the attendants often need to wear so-called three-finger gloves.

The present invention solves these problems.

SUMMARY OF THE INVENTION

The invention thus relates to a method of controlling parked vehicles, wherein a mobile telephone can be used to commence and to terminate parking of a vehicle. A user sends at least one user-specific code to a receiving computer of the vehicle parking system via a mobile telephone, or a fixed telephone system, when commencing and terminating a parking period. At the beginning of a parking period the identity of the parking zone concerned is sent to the parking system computer and a vehicle-specific code is stored in said computer and is tied to the user-specific code. A control unit is provided for wireless communication with said computer to fetch information as to the identity of those vehicles that have commenced but not yet terminated a parking period in the zone concerned, i.e., they are still logged into the system. The control unit includes a mobile telephone that sends to a receiving telephone device coupled to said computer a voice message from said attendant which includes the registration number of a vehicle. The computer compares this registration number with the registration numbers of logged-in vehicles and sends to the mobile telephone a voice message in which the registration number understood by the computer is repeated in the mobile telephone and which includes information as to whether the vehicle is logged-in or not.

BRIEF DESCRIPTION OF THE DRAWINGS

The invention will now be described in more detail partly with reference to an exemplifying embodiment thereof illustrated in the accompanying drawing, in which.

DESCRIPTION OF THE PREFERRED EMBODIMENTS

Figure 1:
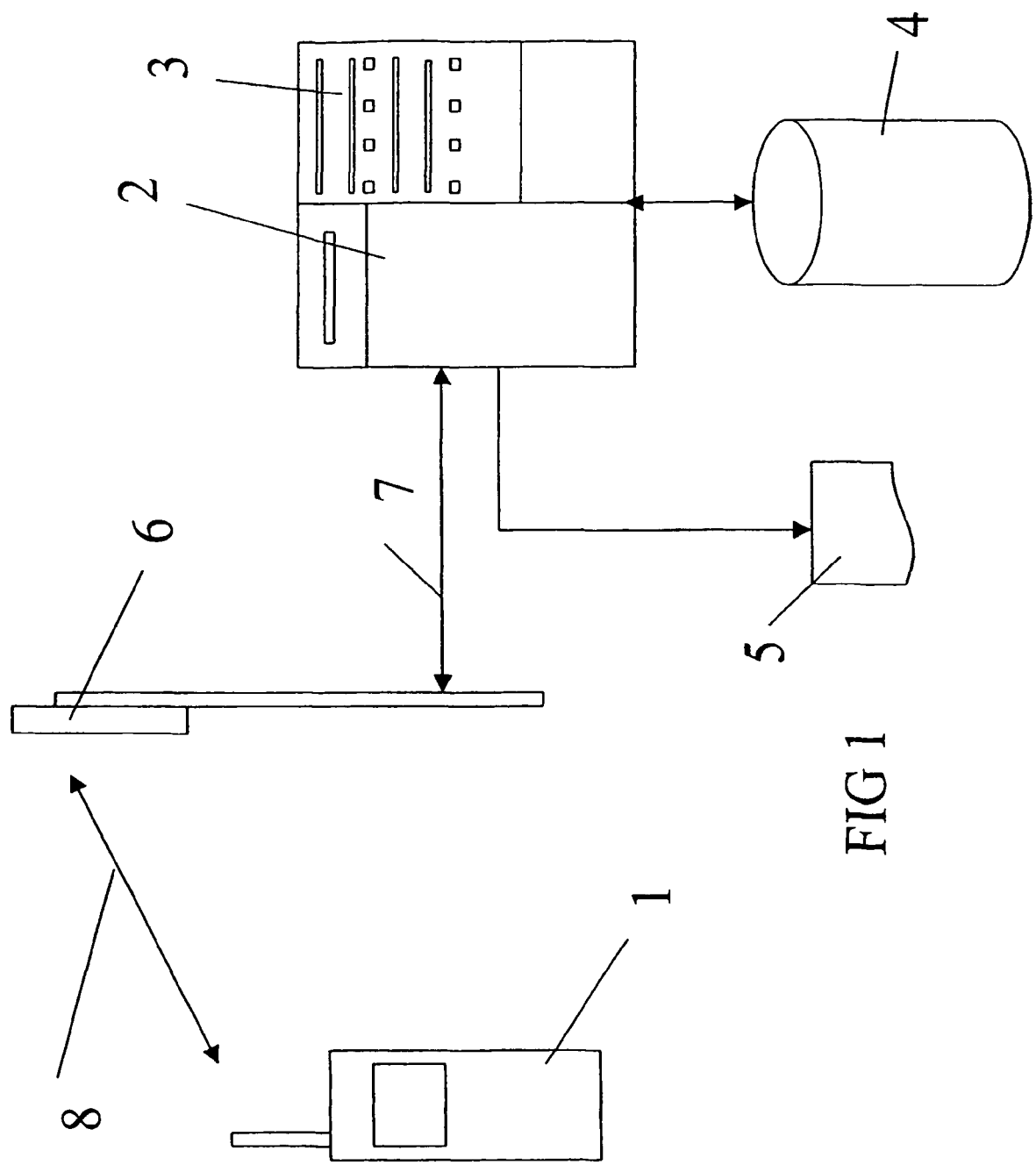
FIG. 1 is a block diagram illustrative of an inventive method.

The present invention relates to a vehicle parking control method in which a mobile telephone can be used to commence and terminate parking of a vehicle and to send a user-specific code to a receiving computer belonging to the parking system. The identity of the zone in which a reporting vehicle is parked is sent to the parking system computer when parking is commenced. A vehicle-specific code is stored in the computer and is tied to the user-specific code.

The control is effected with the aid of a control unit which is adapted for wireless communication with said computer to fetch information as to the identity of those vehicles that have commenced but not yet terminated a parking period in the zone concerned, i.e., they are still logged into the system.

According to the invention, the control unit includes a mobile telephone 1 that sends to a receiving telephone device 2 coupled to said computer 3 a voice message from said attendant which includes vehicle registration numbers. The computer 3 is adapted to compare said registration numbers with the registration numbers of logged-in vehicles. The computer 3 is also adapted to send to the mobile telephone 1 a voice message in which the registration number understood by the computer 3 is repeated in the mobile telephone 1 and which includes information as to whether the vehicle is logged-in or not.

In the event of the computer 3 giving a different registration number, the parking attendant repeats the earlier number given and the computer then repeats the number last given.

Such repetitions are able to eliminate the risk of the computer misunderstanding the number given by the attendant, which would result in an erroneous fine.

Preferably, the computer 3 will also be programmed to send to the attendant a voice message in which there is given the identity of the zone in which the vehicle concerned is logged-in.

The computer 3 is also conveniently connected to a database 4 containing information relating to vehicle-specific codes, the telephone numbers of system users, and billing data tied to that information.

The database 4 may also include the vehicle's make, and its model and color. When such is so, the computer 3 is able to give, e.g., the make and color of the vehicle via a voice message after having repeated the registration number of the vehicle. Moreover, information to the effect that a certain vehicle has been stolen can be fed into the computer 3. Should a parking attendant happen to report the registration number of a stolen vehicle, the computer 3 is able to report this fact to the attendant via a voice message.

In order to enable a relevant parking zone to be given at the beginning of a parking period, each parking zone may for instance be given a unique number comprised of the telephone number that connects the user with the parking system computer. Each zone may have a number for standard parking and a number for residential parking. Other systems are also conceivable, for instance a system in which the user dials a number that connects with the parking system computer and then dials a unique parking zone number, on his/her telephone.

The unique number of the parking zones is suitably indicated on signs, such as on a sign in connection with the parking meters for payment with coins or credit cards.

When wishing to terminate parking, the user again calls the computer 3, which detects the telephone number. The computer scans the database, which discloses that parking has been commenced earlier.

The computer 3 calculates the parking fee on the basis of the time for which the vehicle has been parked, the parking zone, and the type of parking concerned. The computer then ties the fee to the credit card that is tied to the user's telephone number, whereafter the credit card company bills the card owner, i.e., the user.

A vehicle that is included in a telephone parking system is conveniently provided with a sticker or the like that will enable a parking attendant to see readily whether or not the vehicle can be checked mechanically.

According to a preferred embodiment of the invention, the receiving telephone arrangement 2 includes a voice interpreting device which functions to interpret the registration number spoken into the mobile telephone 1 by the parking attendant.

It is preferred that the mobile telephone 1 of each parking attendant will have a unique telephone number and that this number is detected by the telephone arrangement 2 and stored in the computer 3 together with a message sent by the parking attendant.

It is also preferred that the voice interpreting device will be able to recognize and identify the voice of each parking attendant.

In the event of the computer informing the parking attendant, via the mobile telephone, that a vehicle is not logged-in, it is preferred that the attendant will be able to send a confirmation message to the computer 3 by an appropriate entry through the keypad of the telephone 1 or by an appropriate voice message.

Such confirmation enables the computer to extract the vehicles which are to be fined from a list 5 for forwarding to the appropriate authority. When current rules and regulations permit, the computer may be programmed to print out parking fines for dispatch, or to draw the amount of the fine from the account number to which the user and the vehicle are tied in the computer 3.

In many parking zones, a vehicle is not considered to be wrongly parked if it has not been parked without payment for a time longer than a predetermined time period. The time limit for which a vehicle may be parked free of charge is thus normally ten minutes.

When a vehicle is deemed to have been wrongly parked in a relevant parking zone after a given predetermined length of time has passed, the computer is caused to store the registration number of the vehicle together with the time at which the parking attendant reported said registration number, wherein when the attendant again reports the registration number later on, if the vehicle is still parked, and the computer sends a voice message reporting whether the vehicle is logged-in or not.

The transmission 8 of information between the mobile telephone 1 and the computer 3 takes place via a suitable mobile telephone system or corresponding system. Such a system will include base stations 6 connected to a fixed telephone network 7.

It will be evident that the present invention solves the aforesaid problems. The invention allows a parking attendant, who is constantly connected to the parking system computer, to walk along a street and as he passes a vehicle report the registration number and receive immediately information as to whether or not the vehicle is logged-in, whereafter the attendant takes any necessary steps.

Although the invention has been described above with reference to a number of exemplifying embodiments, it will be understood that the system can be modified with respect to the information in the communication between control unit and system computer.

It will therefore be understood that the present invention is not restricted to the above-described embodiments thereof, but that variations can be made within the scope of the following claims.

The invention claimed is:

1. A method of controlling parking of vehicles in a parking system by which a mobile telephone is used to commence and to terminate parking of a vehicle, said method comprising the steps of: sending by mobile telephone at least one user-specific code directly to a receiving computer associated with the parking system when beginning and terminating a parking period for computing the cost for the parking period upon termination of the parking period, whereby the receiving computer contains parking system usage data that is continuously updated concerning vehicles that have commenced a parking period within the parking system as a result of each parking system user sending an associated user-specific code to the receiving computer upon entering the parking system, at the beginning of a parking period sending directly to the parking system receiving computer by mobile telephone the identity of the parking zone concerned and a vehicle-specific code, storing the parking zone identity and the vehicle-specific code in said receiving computer for each parking system user who has sent a user-specific code when parking is commenced and associating them with the user-specific code, providing a control unit including a mobile telephone having a unique telephone number for direct wireless communication with said receiving computer to fetch directly from the receiving computer stored information as to the identity of those vehicles that have commenced but not yet terminated a parking period in the parking zone concerned, which control unit is capable of transmitting a voice message from a parking attendant to the parking system receiving computer, and wherein the control unit mobile telephone serves for sending to a receiving telephone device coupled to said receiving computer a voice message from said attendant which includes an observed vehicle registration number, comparing the observed vehicle registration number with stored registration numbers of logged-in vehicles, and sending to the attendant via the control unit a voice message in which the observed registration number understood by the receiving computer is repeated to the attendant by the control unit and which includes information as to whether the vehicle with which the observed registration number is associated is logged-in or not, and detecting the unique telephone number of the mobile telephone of the parking attendant and storing it in said receiving computer.

2. A method according to claim 1, including the step of informing the parking attendant by voice message in which parking zone an observed vehicle is logged-in.

3. A method according to claim 2, wherein when free parking is permitted for a predetermined time period and a vehicle is not deemed to be wrongly parked in a relevant parking zone until the predetermined time period has expired, the additional step of storing in the receiving computer the registration number of the observed vehicle together with the time at which the parking attendant reported said registration number, and when the parking attendant thereafter again reports the registration number of the observed vehicle and the vehicle is still parked, the step of sending from the receiving computer a voice message to the parking attendant reporting whether the vehicle is still logged-in.

4. A method according to claim 1, wherein the receiving telephone device includes a voice interpreting device for interpreting a registration number spoken by the parking attendant.

5. A method according to claim 1, wherein the mobile telephone unit of each parking attendant has a unique telephone number and that number is detected by a receiving telephone device and is stored in the receiving computer together with a message sent by the parking attendant.

6. A method according to claim 4, wherein the voice interpreting device recognizes and identifies the voice of each parking attendant.

7. A method according to claim 1, wherein in the event of the receiving computer informing the parking attendant by mobile telephone that an observed vehicle is not logged-in, the step of sending a confirmation message from the control unit to the receiving computer by an entry through a keypad of the control unit mobile telephone.

8. A method according to claim 1, wherein in the event of the receiving computer informing the parking attendant by mobile telephone that an observed vehicle is not logged-in, the step of sending a confirmation message from the control unit to the receiving computer by a voice message.

* * * * *